S. T. WALP.
PLANTER.
APPLICATION FILED MAR. 14, 1914.

1,137,933.

Patented May 4, 1915.
3 SHEETS—SHEET 1.

Witnesses

Sherman T. Walp   Inventor by

Attorneys

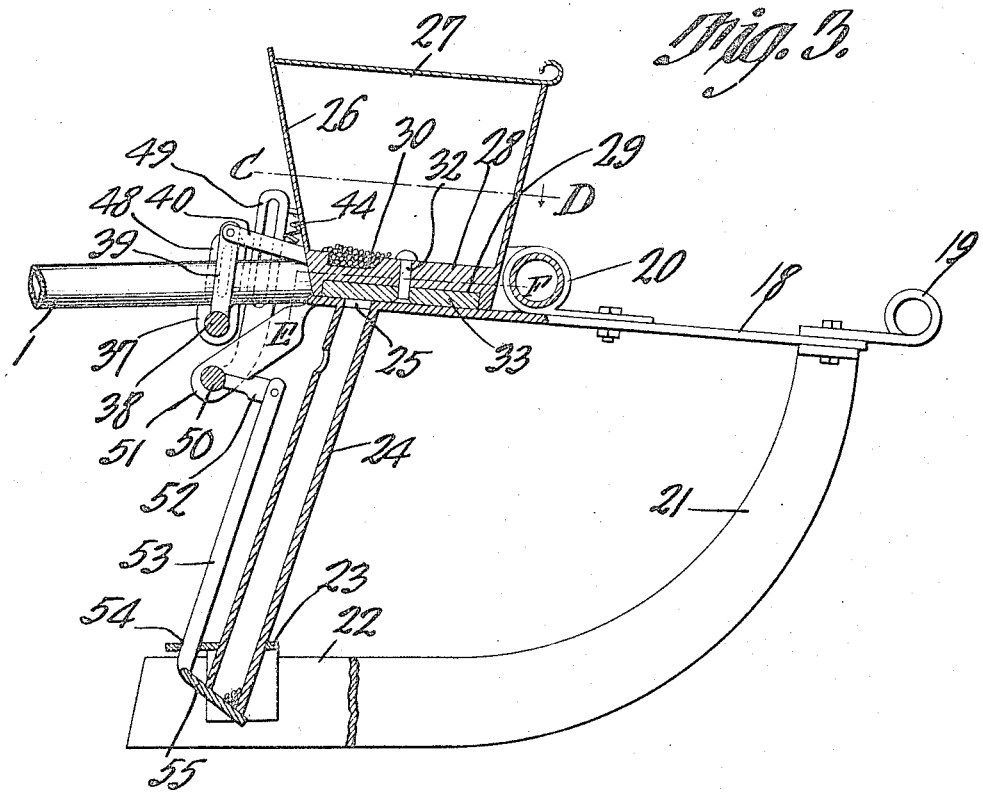
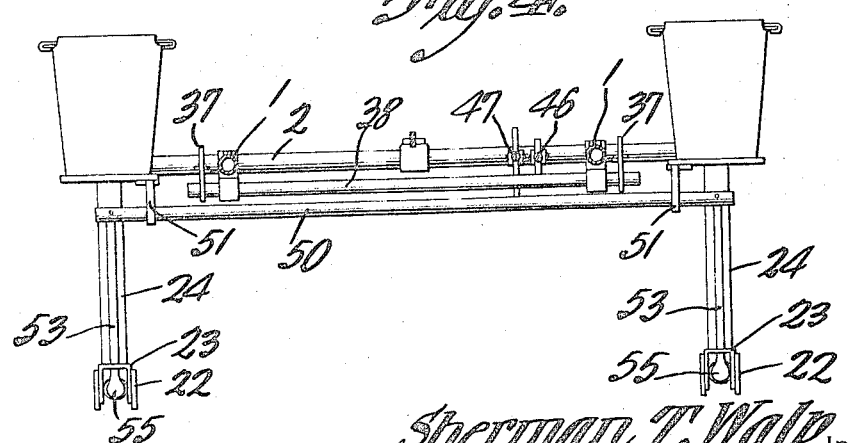

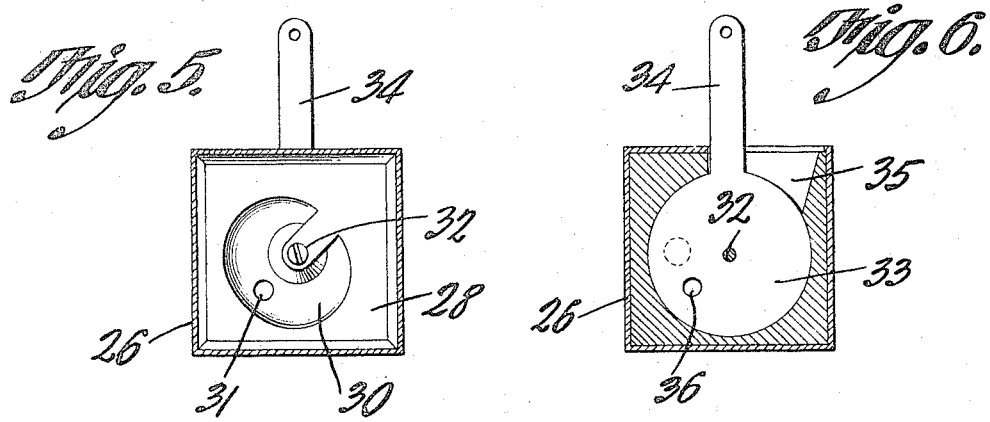
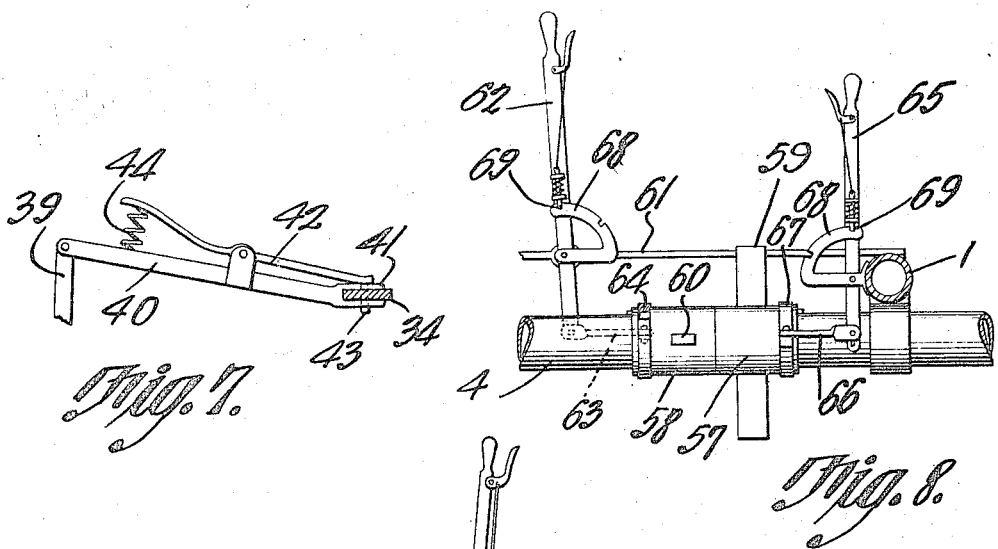
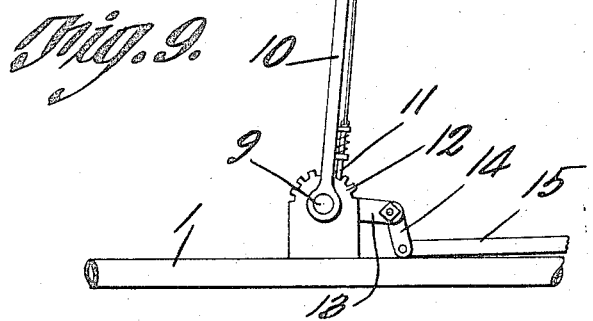

UNITED STATES PATENT OFFICE.

SHERMAN T. WALP, OF SPRINGFIELD, OHIO.

PLANTER.

1,137,933.  Specification of Letters Patent.  Patented May 4, 1915.

Application filed March 14, 1914. Serial No. 824,783.

*To all whom it may concern:*

Be it known that I, SHERMAN T. WALP, a citizen of the United States, residing at Springfield, in the county of Clark and State of Ohio, have invented a new and useful Planter, of which the following is a specification.

This invention relates to planters, one of its objects being to provide improved means whereby the seeds can be dropped at predetermined intervals without the use of a check wire.

A further object is to provide means constantly under the control of the driver by means of which the dropping mechanism connected to either of the seed boxes of the planter can be thrown out of operative relation with its drive mechanism.

A further object is to provide means operated by the supporting wheels of the planter whereby seeds may first be dropped to points near the ground and subsequently dropped into the ground, thus allowing the seeds to be dropped accurately at the points desired.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed, without departing from the spirit of the invention.

In the accompanying drawings the preferred form of the invention has been shown.

Figure 1:
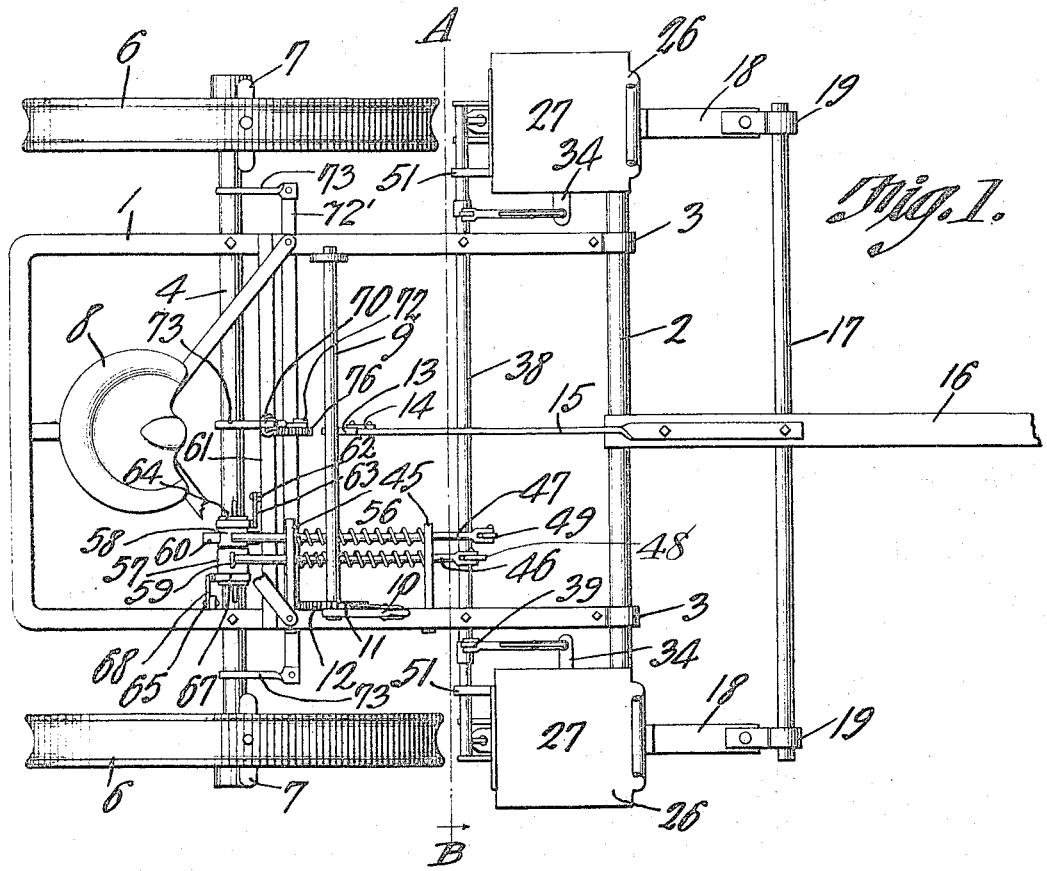
Figure 2:
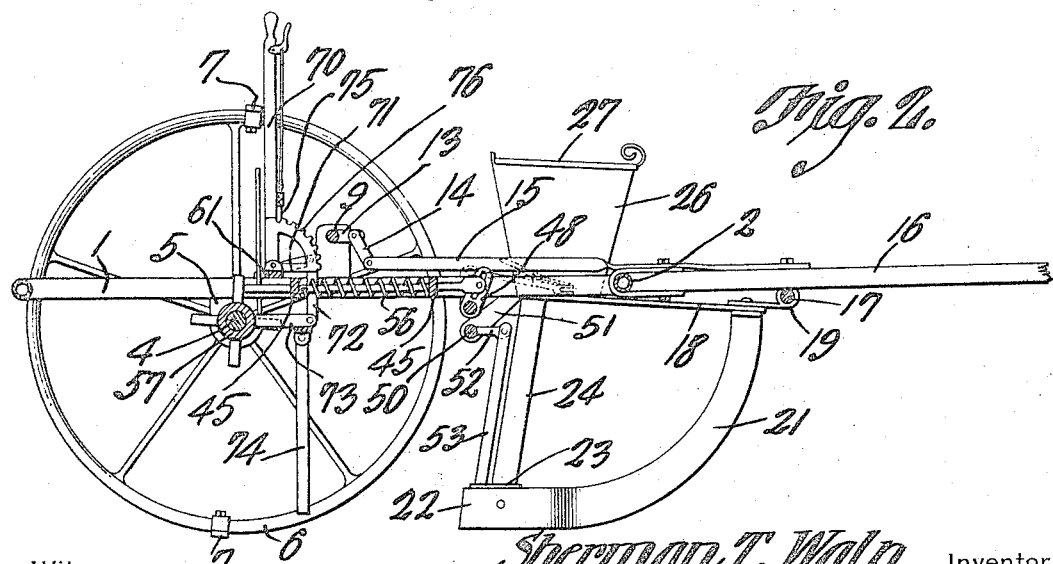

In said drawings:—Figure is a plan view of a two row planter having the present improvements combined therewith. Fig. 2 is a side elevation thereof, certain of the parts being shown in section. Fig. 3 is an enlarged vertical longitudinal section through one of the seed boxes and the parts thereunder. Fig. 4 is a section on line A—B Fig. 1. Fig. 5 is a section on line C—D Fig. 3. Fig. 6 is a section on line E—F Fig. 3, said section being taken solely through the bottom portion of one of the seed boxes. Fig. 7 is an enlarged side elevation of one of the power transmitting pitmen and its connection with the arm of the dropping plate. Fig. 8 is an enlarged rear elevation of the tappets and their adjusting levers. Fig. 9 is a side elevation of a portion of the structure.

Referring to the figures by characters of reference 1 designates a substantially U-shaped frame to the front ends or terminals of which is connected a cross bar 2 mounted for rotation within eyes 3 formed at the terminals of the frame 1. An axle 4 extends under the frame 1 and is mounted for rotation in bearings 5 depending from the sides of the frame. This axle is supported by wheels 6 to which marking plates 7 may be secured, these plates being adapted to dig into the soil and mark off the hills.

The driver's seat is indicated at 8, the same being supported by the rear portion of the frame 1 and extending transversely of and journaled upon the frame 1 at points in front of the seat is a shaft 9 having a lever 10 provided with any suitable means, such as a pawl 11 for engaging a toothed segment 12 fixedly mounted upon one side of the frame 1. Thus it will be seen that shaft 9 can be rotated readily and can be secured in any position to which it may be moved.

Depending from the shaft 9 is a radial arm 13 connected by a link 14 to an arm 15 extending rearwardly from the draft tongue 16, this draft tongue being secured to the bar 2 at the center thereof. Another bar is fixedly connected at its center to the draft tongue 16, this bar being indicated at 17 and being parallel with the bar 2. Side strips 18 are extended under the ends of the bar 2 and are provided, at their forward ends with eyes 19 into which extend the ends of the bar 17. Bearing straps 20 are secured to the side strips 18 and the ends of the bar 2 project into these bearing straps as shown particularly in Fig. 3. The front end of a runner 21 is secured to each strip 18, the runners being curved downwardly and rearwardly and having their rear ends forked, as shown at 22, the sides of each forked portion being connected by an inverted yoke 23. A speed spout 24 extends through the yoke 23 and upwardly to the bottom of the rear portion of strip 18 thereabove, there being an opening 25 in the strip and which discharges into the spout 24. The rear portion of each of the strips 18 is enlarged so as to support a seed box 26 preferably formed with a slidable closure 27. The seed box is provided with a false bottom 28 having a circular recess 29 in the bottom thereof while formed in the top of the bottom 28 is a segmental recess 30 having an outlet opening 31. A pivot pin 32 extends downwardly through the center of the false bottom 29 and journaled on this pin so as to rotate within the recess 29 is a circular dropping plate 33 having a radial arm 34 extending through a slot 35 formed in the inner side of the false bottom 28. The plate 33 has an opening 36 which is normally in register with the opening 31 but normally out of register with the openings 25.

Secured to the sides of frame 1 are bearings 37 in which is journaled a transverse rock shaft 38 having upwardly extending radial arms 39. Each of these arms is connected to a pitman 40 having a forked end 41 which embraces the adjacent arm 34. A lever 42 is fulcrumed on the pitman 40, and carries a coupling pin 43 at one end adapted to extend through the forked terminal 41 and through the arm 34, thus to pivotally connect the arm 34 to the pitman 40. A spring 44 is interposed between lever 42 and pitman 40 so as to hold the pivot pin 43 normally seated in engagement with the arm 34. Obviously by depressing the spring pressed end of lever 42, the pivot pin 43 can be withdrawn from arm 34, thus permitting a quick uncoupling of the parts to be effected.

Extending inwardly from one side of the frame 1 are brackets 45 and slidably mounted in these brackets are parallel rods 46 and 47. The rod 46 is pivotally connected to a longitudinally slotted arm 48 extending upwardly from the rock shaft 38 and is adjustably connected to said slotted arm in any well known manner, as by means of a pivot bolt adjustably clamped to the slotted arm. The other rod 47 is likewise adjustably and pivotally connected to a longitudinally slotted arm 49 extending upwardly from a rock shaft 50 which is journaled in bearings 51 extending rearwardly from the side strips 18. Projecting forwardly from the rock shaft 50 adjacent each end thereof is an arm 52 and pivotally connected to each of these arms 52 is the upper end of a rod 53 slidably mounted within an opening 54 in yoke 33, there being a cut-off plate at the lower end of rod 53 and adapted to close the lower end of the spout 24, as shown in Fig. 3.

A coiled spring 56 is mounted on each rod 46 and 47, one end of the spring bearing against one bracket 45 while the other or rear end of the spring is attached to the rod on which it is mounted. Consequently the springs operate to hold the rods pressed normally rearwardly. Thus it will be seen that the arms 34 are normally drawn rearwardly to the rear end of the slot 35 while the cut-off plates 55 are normally raised against the lower ends of the spouts 24.

Feathered on the axle 4 are sleeves 57 and 58, sleeve 57 being formed with opposed radial tappet fingers 59 while sleeve 58 has opposed radial tapped fingers 60, the fingers 60 being extended at right angles to the fingers 59. A cross bar 61 is mounted on frame 1 and secured to this cross bar is a lever 62 the lower end of which is connected, by a link 63, to a ring 64 extending around the sleeve 58. Another lever 65 is supported close to one side of frame 1 and is connected by a link 66 to a ring 67 extending around the other sleeve 57. Both levers 62 and 65 have notched segments 68 for engagement by spring pressed pawls 69 carried by the levers. Thus it will be seen that the levers can be locked in any positions to which they may be adjusted. The tappets are so arranged that, when they are in their active positions, the fingers 59 will move successively against the rear end of rod 46 while the fingers 60 will move successively against the rear end of rod 47. By means of the levers 62 and 65 either or both of the sleeves can be shifted along the rotating axle 4 so as thus to hold the tappet fingers out of operative relation with the rods.

A lever 70 is fulcrumed on the cross bar 61 and has an arm 71 extending forwardly from its lower end, this arm being connected by a link 72 to a rod 72' connecting arms 73 which are mounted to swing upon the axle 4. These arms 73 have legs 74 depending therefrom. By shifting lever 70 forwardly, legs 74 can be caused to press against the ground, thus to lift the planter and allow the wheels 6 and the marking plates 7 to be rotated until the marking plates have been brought to desired positions relative to the ground. This arrangement is particularly desirable where the planter is being started at the end of a row and it is necessary to arrange the marker 7 so that it will aline with the marks previously formed. The lever 70 may be provided with a pawl 75 for engaging a toothed segment 76 whereby the lever 70 and the legs 74 may be secured in any position to which they may be adjusted.

In using the machine the boxes 26 are filled with seeds and with the sleeves 57 and 58 in their normal positions, as shown in Fig. 8, the machine is driven forward over the field to be planted. Axle 4 is caused to rotate and the sleeves referred to will also rotate. One of the fingers 59 will push against the rod 46 and cause it to rock the shaft 38. Consequently the dropping plate 33 will be rotated. As some of the seeds deposited in the box will gravitate through opening 31 and into opening 36, it will be apparent that this rotation of the dropping plate 33 will result in the conveyance of the seeds within opening 36 to the opening 25 into which they will gravitate, thus sliding downwardly within the spout 24 and dropping onto the plate 55. As soon as the tappet finger 59 has moved past the rod 46, the spring on said rod will return it and the dropping plate to their initial positions.

Immediately subsequent to the actuation of the dropping plate in the manner set forth, one of the tappet fingers 60 will move against the end of rod 47 and shift the rod longitudinally against the action of its spring. This will result in rocking shaft 50 and causing arm 52 to swing downwardly. Consequently plate 55 will move downwardly away from the lower end of the spout 24 and the seed previously deposited on said plate will drop the short distance necessary to the ground. As soon as the tappet finger has passed away from rod 47 the spring on said rod will return the various parts to their initial positions.

It will be seen that by providing mechanism such as herein described, the seeds are given an initial drop through the long distance from the seed boxes to the cut-off plates 55 and, at the proper time, are released from the spout 24. As the seeds only fall short distances from the spout it will be seen that they will be accurately placed in the ground.

By means of the lever 13, the arm 15 can be swung downwardly with bar 2 as its fulcrum, thus causing the bar 17 and side strips 18 to swing about the bar 2. This will result in the lowering of the front end of frame 1 and consequently will cause the runners to dig farther into the soil. By reversing the movement of the parts the runners will be elevated out of contact with the ground. By shifting lever 62, sleeve 58 can be moved out of active relation with the rod 47 and, by means of lever 65, the sleeve 57 and its tappet fingers can be shifted out of active position. Thus it will be seen that the dropping of the seeds is always under the control of the operator.

As before stated, should it be desired to reset the wheels 6 on which the marking plates 7 are secured, it is merely necessary to lift the rear portion of the planter by means of a jack made up of legs 74 and operating parts whereupon said wheels can be rotated without shifting the planter forwardly or rearwardly.

What is claimed is:—

1. In a planter, the combination with a seed feed, a seed spout, and means for closing the seed spout at its lower end, of a revoluble axle, separate tappet devices revoluble therewith, and separate spring controlled mechanisms operated by the respective tappet devices for actuating the seed feed and the spout closing means respectively, said mechanisms being adjustably connected to the seed feed and spout closing means to vary the operative relation thereof.

2. The combination with a seed feed, a seed spout, and a closure at the lower end of the spout, of separate rock shafts, radial arms extending therefrom, connections between the respective arms and the seed feed and closure respectively, longitudinally slotted arms extending from the respective rock shafts, spring controlled rods slidably mounted, each rod being pivotally connected to one of the slotted arms and being adjustable along said arms toward or from its rock shaft, an axle mounted for rotation, separate tappets thereon, means for coupling either of said tappets to the axle, each tappet constituting means for pressing against and actuating one of the rods.

In testimony that I claim the foregoing as my own, I have hereto affixed my signature in the presence of two witnesses.

SHERMAN T. WALP.

Witnesses:
   C. C. JENKINS,
   GEORGE S. RAUP.